US009145940B2

(12) United States Patent
Muramatsu et al.

(10) Patent No.: US 9,145,940 B2
(45) Date of Patent: Sep. 29, 2015

(54) ELECTRIC LINEAR MOTION ACTUATOR AND ELECTRIC BRAKE SYSTEM (75) Inventors: Makoto Muramatsu, Iwata (JP); Tatsuya Yamasaki, Iwata (JP); Masaaki Eguchi, Iwata (JP); Tomomi Goto, Iwata (JP)

(73) Assignee: NTN Corporation, Osaka (JP)

( * ) Notice: Subject to any disclaimer, the term of this patent is extended or adjusted under 35 U.S.C. 154(b) by 120 days.

(21) Appl. No.: 13/696,088

(22) PCT Filed: Apr. 27, 2011

(86) PCT No.: PCT/JP2011/060248
§ 371 (c)(1),
(2), (4) Date: Nov. 5, 2012

(87) PCT Pub. No.: WO2011/142260
PCT Pub. Date: Nov. 17, 2011

(65) Prior Publication Data
US 2013/0048443 A1 Feb. 28, 2013

(30) Foreign Application Priority Data

May 14, 2010 (JP) .................................. 2010-111966

(51) Int. Cl.
F16D 65/18 (2006.01)
F16D 55/00 (2006.01)
(Continued)

(52) U.S. Cl.
CPC ............ *F16D 65/18* (2013.01); *F16H 25/2021* (2013.01); *F16D 2121/24* (2013.01);
(Continued)

(58) Field of Classification Search
CPC ..... F16H 25/12; F16D 65/18; F16D 2121/24; F16D 2125/40; F16D 2125/50; B60T 13/741
USPC ........................................................ 188/72.1
See application file for complete search history.

(56) References Cited

U.S. PATENT DOCUMENTS 4,627,292 A    12/1986   Dekrone
4,936,148 A     6/1990   Shaw et al.
(Continued)

FOREIGN PATENT DOCUMENTS

DE    197 53 554    7/1999
JP       5-12120     2/1993
(Continued)

OTHER PUBLICATIONS

International Search Report issued Jun. 14, 2011 in International (PCT) Application No. PCT/JP2011/060248.
(Continued)

*Primary Examiner* — Anna Momper
*Assistant Examiner* — San Aung
(74) *Attorney, Agent, or Firm* — Wenderoth, Lind & Ponack, L.L.P.

(57) ABSTRACT

An electric brake system is proposed which includes an electric linear motion actuator and can generate the required braking force with high accuracy. A load sensor (30) is provided in a motion converting mechanism of the actuator which converts the rotary motion of a rotary shaft (4) to which the rotation of an electric motor (2) is transmitted to linear motion of an outer ring member (5) as an output member. The load sensor (30) detects the pushing force with which the outer ring member (5) linearly drives a driven member. With this arrangement, if the driven member is a braking member of an electric brake system, it is possible to directly detect the braking force applied by the driven member and thus to accurately generate the required braking force.

24 Claims, 8 Drawing Sheets (51) Int. Cl.
*F16H 25/20* (2006.01)
*F16D 121/24* (2012.01)
*F16D 125/40* (2012.01)
*F16D 125/48* (2012.01)
*F16D 127/06* (2012.01)
*F16D 129/08* (2012.01)
*F16H 25/22* (2006.01)

(52) U.S. Cl.
CPC ......... *F16D2125/40* (2013.01); *F16D 2125/48* (2013.01); *F16D 2127/06* (2013.01); *F16D 2129/08* (2013.01); *F16H 25/2252* (2013.01); *Y10T 74/18568* (2015.01); *Y10T 74/18576* (2015.01)

(56) References Cited

U.S. PATENT DOCUMENTS

| | | | |
|---|---|---|---|
| 5,142,225 A | 8/1992 | Gerlach et al. | |
| 5,355,714 A | 10/1994 | Suzuki et al. | |
| 5,521,497 A | 5/1996 | Schneider et al. | |
| 6,176,352 B1 | 1/2001 | Maron et al. | |
| 6,405,836 B1 | 6/2002 | Rieth et al. | |
| 6,507,187 B1 | 1/2003 | Olivas et al. | |
| 6,591,688 B2 | 7/2003 | Wright | |
| 6,668,983 B2 | 12/2003 | Drennen et al. | |
| 7,034,709 B2 | 4/2006 | Young et al. | |
| 7,117,748 B2 | 10/2006 | Baumann et al. | |
| 8,141,688 B2 * | 3/2012 | Matsushita et al. | 188/72.1 |
| 8,201,677 B2 * | 6/2012 | Hayakawa et al. | 192/83 |
| 8,235,181 B2 * | 8/2012 | Sano et al. | 188/2 D |
| 8,579,090 B2 * | 11/2013 | Yamasaki | 188/72.8 |
| 2002/0104718 A1 * | 8/2002 | Suzuki | 188/72.1 |
| 2004/0074306 A1 * | 4/2004 | Kinoshita et al. | 73/774 |
| 2004/0163900 A1 * | 8/2004 | Beuerle et al. | 188/72.1 |
| 2009/0078489 A1 * | 3/2009 | Feier et al. | 180/339 |
| 2009/0095579 A1 | 4/2009 | Yamasaki | |
| 2011/0247904 A1 | 10/2011 | Yamasaki | |

FOREIGN PATENT DOCUMENTS

| | | | |
|---|---|---|---|
| JP | 6-170084 | 6/1994 | |
| JP | 6-174563 | 6/1994 | |
| JP | 06-327190 | 11/1994 | |
| JP | 7-34331 | 6/1995 | |
| JP | 2003-220638 | 8/2003 | |
| JP | 2003-343620 | 12/2003 | |
| JP | 2004-125027 | 4/2004 | |
| JP | 2005-325889 | 11/2005 | |
| JP | 2007-032717 | 2/2007 | |
| JP | 2007-037305 | 2/2007 | |
| JP | 2010-090959 | 4/2010 | |
| WO | WO 2010041588 A1 * | 4/2010 | F16H 25/22 |

OTHER PUBLICATIONS

Written Opinion of the International Searching Authority issued Jun. 14, 2011 in counterpart PCT/JP2011/060248 (with English translation).

* cited by examiner

ELECTRIC LINEAR MOTION ACTUATOR AND ELECTRIC BRAKE SYSTEM

TECHNICAL FIELD

The present invention relates to an electric linear motion actuator for converting the rotary motion of an electric motor to linear motion, thereby linearly driving a driven member, and an electric brake system wherein a braking is pressed against a braked member by means of the electric linear motion actuator.

BACKGROUND ART

A known electric linear motion actuator for converting the rotary motion of an electric motor to linear motion, thereby linearly driving a driven member, includes a motion converter mechanism such as a slide screw mechanism, a ball-screw mechanism or a ball-ramp mechanism for converting the rotary motion of the rotor shaft of an electric motor or of a rotary member to which the rotation of the rotor shaft is transmitted to the linear motion of an output member for linearly driving the driven member. Many of this type of electric linear motion actuators include a gear type speed reducer such as a planetary gear type speed reducer so that a large linear driving force is obtainable with a small-capacity electric motor (see e.g. JP Patent Publication 6-327190A).

The inventors of the present invention proposed electric linear motion actuators which can generate a large linear driving force without using a separate speed reducer and which is suitable for use in an electric brake system, of which the linear stroke of the movable member is relatively short (see e.g. JP Patent Publication 2007-32717A and JP Patent Publication 2007-37305A). These actuators include a rotary shaft member which is one of the rotor shaft of the electric motor and a rotary shaft to which the rotation of the rotor shaft is transmitted, an outer ring member provided around the rotary shaft member and fitted in the radially inner surface of a housing, a plurality of planetary rollers rotatably supported by a carrier so as to be disposed between the rotary shaft member and the outer ring member, the planetary rollers being configured to revolve around the rotary shaft member while rotating about the axes of the individual planetary rollers when the rotary shaft member rotates, wherein a helical rib is formed on the radially inner surface of the outer ring member and each of the planetary rollers has on its radially outer surface circumferential grooves which are equal in pitch to the helical rib or a helical groove which is equal in pitch to, and different in lead angle from, the helical rib, the helical rib being engaged in the circumferential grooves or the helical grooves of the respective planetary rollers, whereby the rotary motion of the rotary shaft member is converted to the linear motion of the carrier as the output member for linearly driving the driven member, thereby linearly moving the outer ring member and the carrier relative to each other.

Most brake systems for vehicles had been of hydraulic types. But due to recent introduction of sophisticated brake control arrangements such as antilock brake systems (ABS), electric brake systems, which can perform such brake control without the need for a complicated hydraulic circuit, are gathering much attention. Electric brake systems include an electric motor and an electric linear motion actuator of the above-described type, which is mounted in the caliper body of the brake system. When the brake pedal is depressed, a signal is produced to activate the electric motor, and the motor drives the braking member through the actuator, thereby pressing the braking member against the braked member (see e.g. JP Patent Publication 2003-343620A).

This type of electric brake systems, which include the above-described electric linear motion actuator, have means for controlling the braking force. One of such means calculates the motor torque based on the current being supplied to the electric motor and adjusts the current to be supplied to the motor to a predetermined value corresponding to the required braking force. Another such means detects the angular position of the electric motor and adjusts the angular position of the motor to a predetermined position corresponding to the required braking force.

With the arrangements in which the required braking force is produced by applying the predetermined current to the motor or rotating the motor to the predetermined angular position, it is difficult to accurately linearly move the output member to the required position due e.g. to manufacturing errors of component parts forming the electric linear motion actuator or slip of the motion converter mechanism, which in turn makes it difficult to produce the required braking force.

SUMMARY OF THE INVENTION

An object of the present invention is to provide an electric brake system including an electric linear motion actuator which can produce a required braking force with high accuracy.

In order to achieve this object, the present invention provides an electric linear motion actuator comprising a motion converter mechanism for converting a rotary motion of a rotor shaft of an electric motor, or a rotary motion of a rotary member to which the rotation of the rotor shaft is transmitted to a linear motion of an output member for linearly driving a driven member, wherein the driven member is configured to be pushed by a front side of the output member, wherein a load sensor is mounted in the motion converter mechanism, the load sensor being configured to detect a pushing force with which the output member pushes the driven member when the driven member is linearly driven by the output member.

By providing a load sensor for detecting a pushing force with which the output member pushes the driven member when the driven member is linearly driven by the output member in the motion converter mechanism, it is possible to directly detect the braking force applied by the driven member of an electric brake system, and thus to accurately produce the required braking force.

The load sensor is preferably protected by a heat insulator to prevent failure of the load sensor or reduction in detection accuracy of the load sensor under the influence of heat when the ambient temperature rises.

The heat insulator is preferably disposed between the load sensor and a component part of the motion converter mechanism which is in contact with the load sensor without the heat insulator. With this arrangement, the heat insulator prevents heat conduction from this component part to the load sensor, thus reducing heat buildup of the load sensor. The heat insulator may be made of a ceramic material or a resin, which are known to be heat-resistant and low in heat conductivity.

The load sensor may be any of a load cell, a piezoelectric sensor, a semiconductor load sensor and a magnetostrictive load sensor. A piezoelectric sensor is a sensor including a piezoelectric element. A semiconductor load sensor is a sensor including a semiconductor strain gauge. A magnetostrictive load sensor utilizes the principle that the magnetic permeability changes under a stress when a load is applied to an elastic material which is high in magnetic permeability.

Preferably, the motion converter mechanism comprises a rotary shaft member which is one of the rotor shaft of the electric motor and a rotary shaft which comprises the rotary member, an outer ring member provided around the rotary shaft member and fitted in a radially inner surface of a housing, a plurality of planetary rollers rotatably supported by a carrier so as to be disposed between the rotary shaft member and the outer ring member, the planetary rollers being configured to revolve around the rotary shaft member while rotating about axes of the individual planetary rollers when the rotary shaft member rotates, wherein a helical rib is formed on a radially inner surface of the outer ring member and each of the planetary rollers has on its radially outer surface circumferential grooves which are equal in pitch to the helical rib or a helical groove which is equal in pitch to, and different in lead angle from, the helical rib, the helical rib being engaged in the circumferential grooves or the helical grooves of the respective planetary rollers, whereby the motion converter mechanism converts the rotary motion of the rotary shaft member to linear motion of one of the outer ring member and the carrier as the output member for linearly driving the driven member, thereby linearly moving the outer ring member and the carrier relative to each other. With this arrangement, it is possible to generate a large linear driving force without the need to mount a separate speed reducer.

Preferably, the carrier is prevented from moving axially, and the outer ring member is fitted in the housing so as to be rotationally fixed to the housing and slidable relative to the housing, whereby the outer ring member serves as the output member for linearly driving the outer ring member. With this arrangement, since the outer ring member is guided by the radially inner surface of the housing over a large axial dimension, the output member can be smoothly linearly moved even if a lateral moment acts on the output member.

The load sensor is preferably provided on a rear side of the outer ring member as the output member, which is opposite to the front side of the outer ring member, which pushes the driven member, to reduce the environmental temperature around the load sensor.

The load sensor may be disposed between a thrust bearing axially supporting a rear side of the carrier, which receives a reaction force of the pushing force of the outer ring member, and a backup member supporting a rear side of the thrust bearing.

Alternatively, the load sensor may be disposed between a backup member supporting a rear side of the carrier, which receives a reaction force of the pushing force of the outer ring member, through a thrust bearing and a stopper restricting the movement of the backup member in a rearward direction.

The present invention provides an electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is one of the above-described various electric linear motion actuators according to the present invention. With this arrangement, it is possible to directly detect the braking force, and thus to accurately produce the required braking force.

Since the electric linear motion actuator according to the present invention includes a load sensor mounted in the motion converter mechanism to detect the pushing force with which the output member linearly drives the driven member, it is possible to directly detect the braking force applied by the driven member, if the driven member is the braking member of an electric brake system, and thus to accurately produce the required braking force.

Since the electric brake system includes the electric linear motion actuator according to the present invention, it is possible to accurately generate the required braking force.

BRIEF DESCRIPTION OF THE DRAWINGS

FIGS. 4(*a*) and 4(*b*) are front views of an outer ring member of FIG. 1 showing its helical ribs, and a planetary roller of FIG. 1 showing its helical groove, respectively.

FIG. 5(*a*) is a sectional view of a portion of the actuator, showing how a load cell is arranged; and FIG. 5(*b*) is a similar sectional view showing a different arrangement of the load cell.

DETAILED DESCRIPTION OF THE INVENTION

Figure 1:
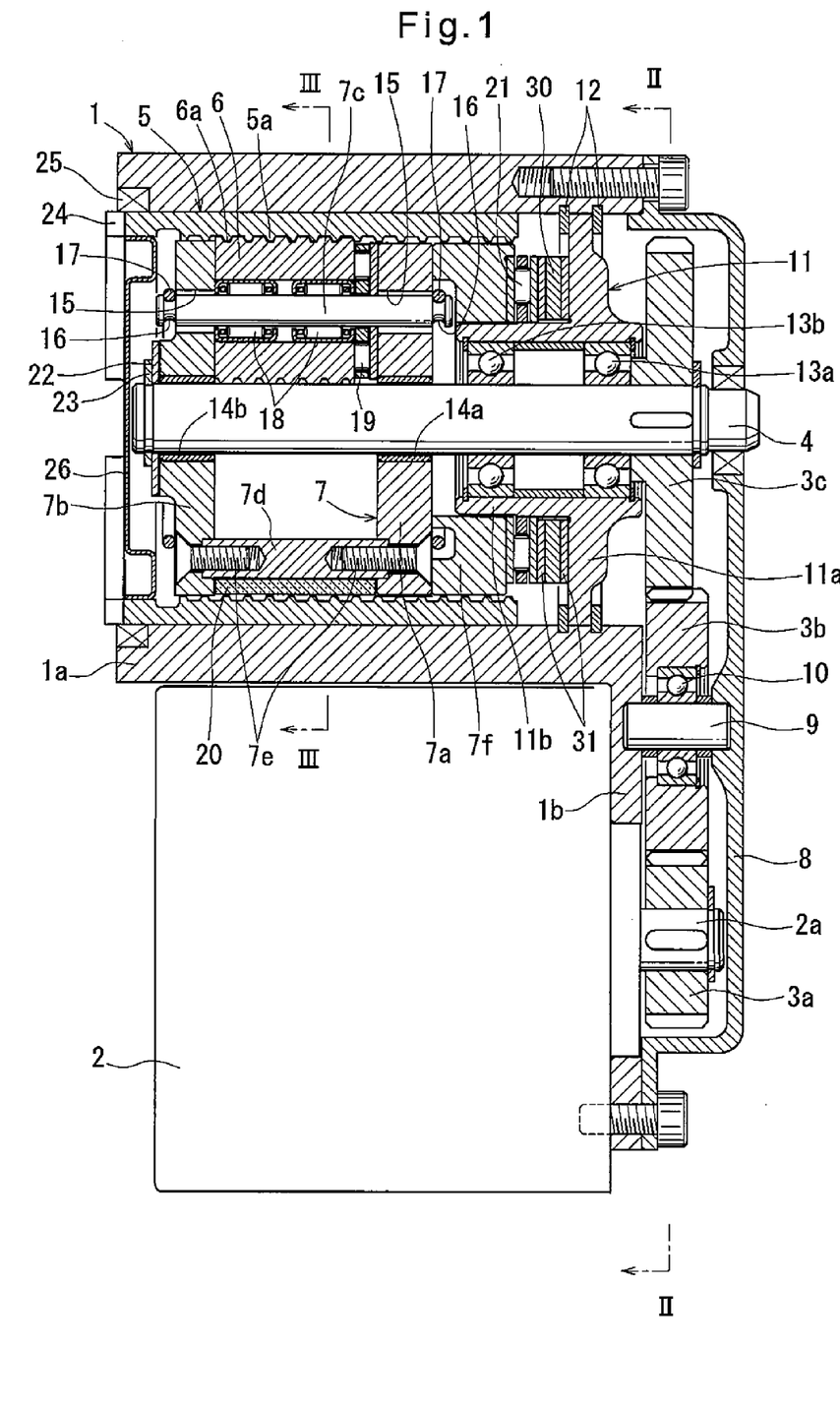
FIG. 1 is a vertical sectional view of an electric linear motion actuator embodying the present invention.
Figure 2:
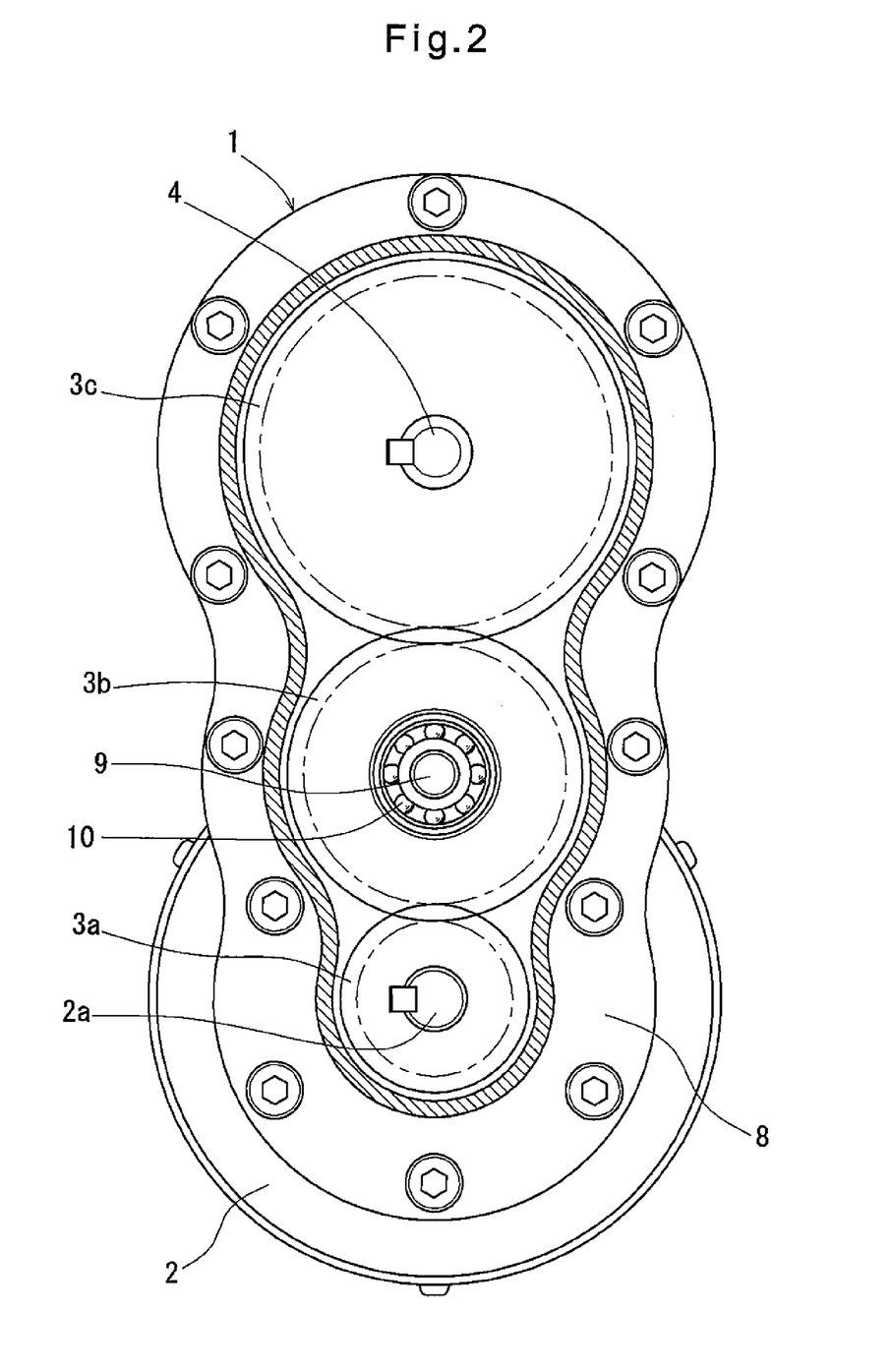
FIG. 2 is a sectional view taken along line II-II of FIG. 1.
Figure 3:
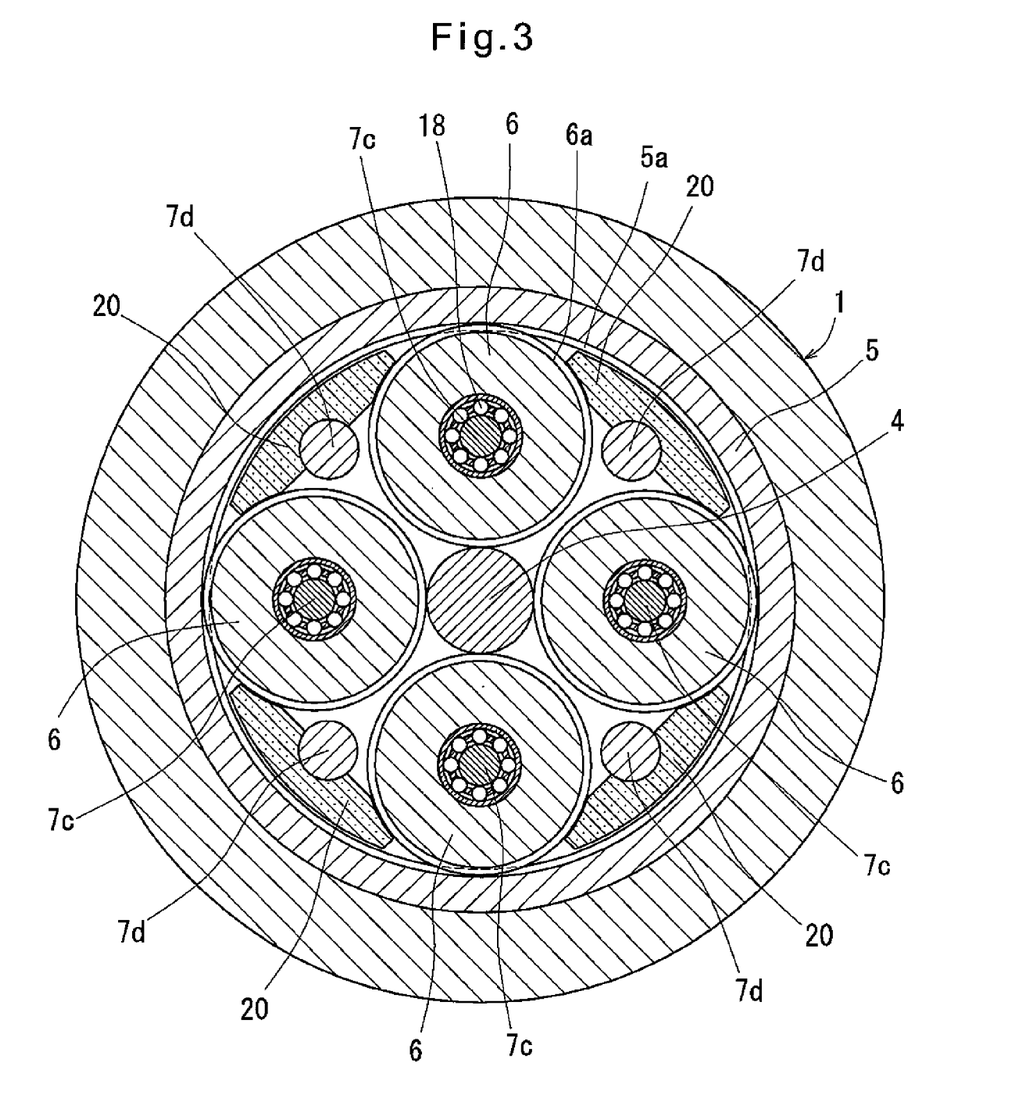
FIG. 3 is a sectional view taken along line III-III of FIG. 1.

The electric linear motion actuator embodying the present invention is now described with referenced to the drawings. As shown in FIGS. 1 to 3, the actuator includes a housing 1 having a cylindrical portion 1*a* formed with a flange 1*b* at one end thereof to extend to one side. The flange 1*b* carries an electric motor 2 so as to extend parallel to the cylindrical portion 1*a*. The electric motor 2 has a rotor shaft 2*a* whose rotation is transmitted to a rotary shaft 4 extending along a center axis of the cylindrical portion through gears 3*a*, 3*b* and 3*c*. The actuator further includes an outer ring member 5 fitted in the radially inner surface of the cylindrical portion 1*a*, four planetary rollers 6 disposed between the outer ring member 5 and the rotary shaft 4 and rotatably supported by a carrier 7. When the rotary shaft 4 rotates, the planetary rollers 6 revolve around the rotary shaft while rotating about their respective center axes. The actuator further includes a motion converter mechanism which includes helical ribs 5*a* (to be described later) on the outer ring member 5 and helical grooves 6*a* of the respective planetary rollers 6 in which the helical ribs 5*a* are engaged. The motion converter mechanism converts the rotation of the rotary shaft to axial relative movement between the carrier 7, which supports the planetary rollers 6, and the outer ring member 5. In this embodiment, the outer ring member 5 constitutes an output member adapted to be linearly moved, thereby pushing and linearly moving a driven member with its front end surface, with the carrier 7 kept from moving axially.

A lid 8 is mounted to the end of the housing 1 where there is the flange 1*b*. The gears 3*a*, 3*b* and 3*c* are mounted in the space enclosed in the lid 8 so as to mesh with each other on a single axial plane. The gear 3*a* is mounted on the rotor shaft 2*a*, the gear 3*c* is mounted on the rotary shaft 4, and the intermediate gear 3*b*, which meshes with both gears 3*a* and 3*c*, is supported by a shaft pin 9 extending between the flange 1*b* and the lid 8 through a ball bearing 10.

A bearing fixing member 11 is disposed between the gear 3*c*, through which the rotation of the rotor shaft 2*a* is transmitted to the rotary shaft 4, and the planetary rollers 6, which are in rolling contact with the rotary shaft 4, and supports the rotary shaft 4. The bearing fixing member 11 is further fixed to the radially inner surface of the cylindrical portion 1a of the housing 1 by means of snap rings 12. The bearing fixing member 11 includes an annular portion 11a fixed to the radially inner surface of the cylindrical portion 1a, and a cylindrical portion 11b protruding toward the planetary rollers 6 from the radially inner portion of the annular portion 11a. Angular ball bearings 13a and 13b are mounted on the radially inner surfaces (which, as shown in FIG. 1, together constitute a single common radially inner surface) of the annular portion 11a and the cylindrical portion 11b, respectively, so as to be axially spaced apart from each other with their backs facing each other, to rotatably support the rotary shaft 4.

The carrier 7 includes a carrier body 7a and a support plate 7b which are spaced apart from each other and rotatably and slidably fitted around the rotary shaft 4 through respective slide bearings 14a and 14b. The carrier 7 further includes support pins 7c each having its respective ends supported by the carrier body 7a and the support plate 7b and rotatably supporting the respective planetary rollers 6, and a plurality of coupling rods 7d coupling the support plate 7b to the carrier body 7a so as to be in phase with the carrier body 7a. Each coupling rod 7d has its respective ends coupled to the carrier body 7a and the support plate 7b by bolts 7e. Each support pin 7c has its end portions engaged in radially elongated holes 15 formed in the carrier body 7a and the support plate 7b so as to be radially movable but not circumferentially movable.

Grooves 16 are formed on the radially outer surface of each support pin 7c at first and second end portions, respectively. A ring spring 17 made of spring steel and having circumferentially opposed separate ends is fitted in the grooves 16 at each of the first and second end portions of the support pins 7c so as to envelop the support pins in a radially expanded state, thereby radially inwardly biasing the support pins. The ring springs 17 thus press the planetary rollers 6, which are rotatably supported by the respective support pins 7c, against the radially outer surface of the rotary shaft 4, thus stably transmitting the torque of the rotary shaft 4 to the planetary rollers 6.

Each planetary roller 6 is rotatably supported by the support pin 7c of the carrier through a needle roller bearing 18 fitted in the radially inner surface of the roller 6, and is supported by the carrier body 7a through a thrust roller bearing 19 so as to be rotatable about its axis. The actuator further includes fan-shaped lubricant applicator members 20 retained between the respective adjacent planetary rollers 6 and between the respective coupling rods 7d and the radially inner surface of the outer ring member 5 and kept in sliding contact with the radially outer surfaces of the planetary rollers 6 on both sides of the respective applicator members 20 to apply lubricant thereto.

The carrier body 7a of the carrier 7 is rotatably supported by the annular portion 11a of the bearing fixing member 11 as a backup member by means of a thrust roller bearing 21 through a support member 7f. The support member 7f, which is provided on the opposite side of the planetary rollers 6, is inseparably retained in position by a snap ring 23 through a slide bearing 22, thus preventing axial movement of the carrier 7.

The outer ring member 5, as the output member, is slidably fitted in the cylindrical portion 1a of the housing 1, and has key grooves 24 on its front end surface for coupling and rotationally fixing the driven member. An annular seal member 25 provides a seal between the radially outer surface of the outer ring member 5 and the cylindrical portion 1a. A seal member 26 in the form of a membrane covers the end of the rotary shaft 4, which is fitted in the support plate 7b of the carrier 7, to seal the radially inner portion of the outer ring member 5.

Figure 4A:
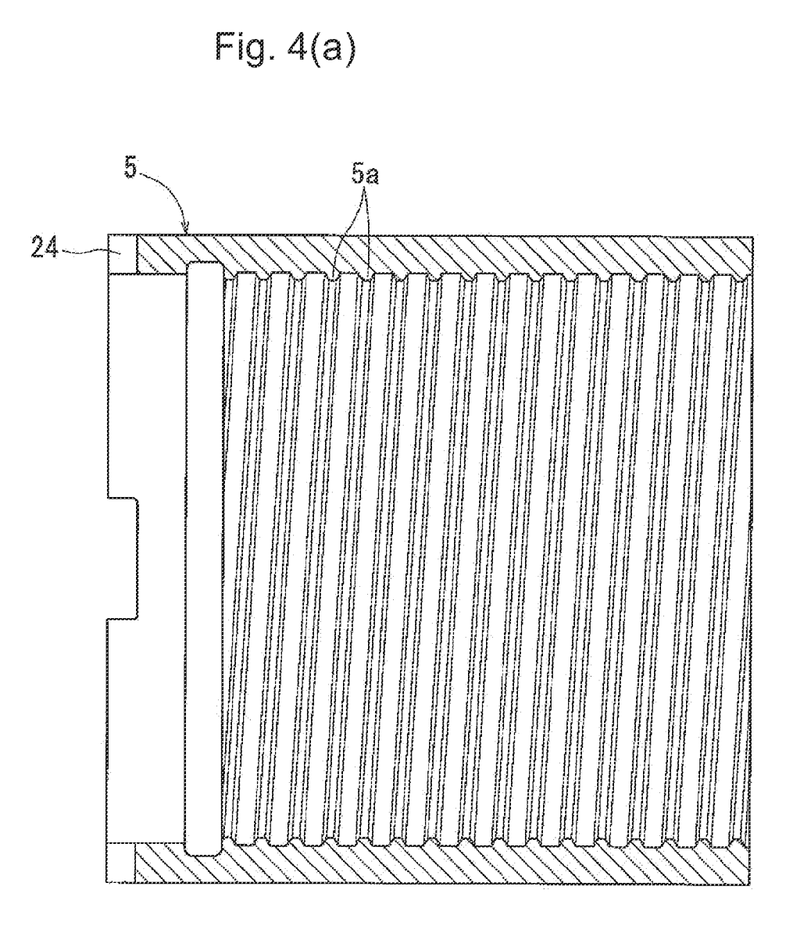
Figure 4B:
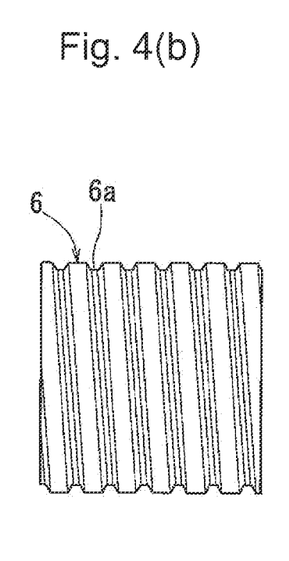

As shown in FIGS. 4(a) and 4(b), the two helical ribs 5a are formed on the radially inner surface of the outer ring member 5. The helical groove 6a, which is formed on the radially outer surface of each planetary roller 6 and in which the helical ribs 5a engage, is equal in pitch to, and different in lead angle from, the helical ribs 5a. Due to the engagement of the helical ribs 5a in the helical grooves 6a, when the planetary rollers 6 revolve around the rotary shaft 4 while rotating about their individual axes, the planetary rollers 6 axially move relative to the outer ring member 5 by a distance determined by the difference in lead angle between the helical ribs 5a and the helical grooves 6a. Two helical ribs 5a are provided so that the difference in lead angle between the helical ribs 5a and the helical grooves 6a of the planetary rollers 6 can be determined within a wide range. But only one helical rib 5a may be used instead. Instead of the helical groove 6a, a plurality of circumferential grooves which are equal in pitch to the helical ribs 5a may be formed on the radially outer surface of each planetary roller 6.

Figure 5A:
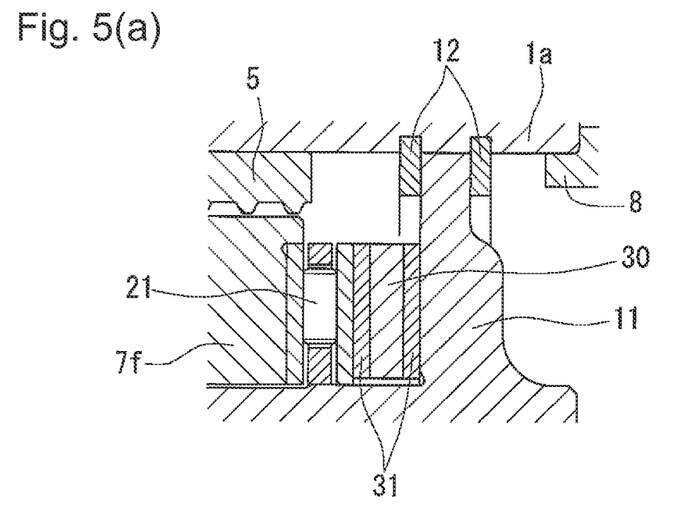

As shown in FIG. 5(a), a load cell 30 is disposed between the thrust roller bearing 21, which axially supports the support member 7f at the rear of the carrier 7, and the bearing fixing member 11 as the backup member supporting the rear of the bearing 21. The load cell 30 serves as a load sensor for detecting the pushing force with which the outer ring member 5, as the output member, pushes the driven member. The load cell 30 is sandwiched between the thrust roller bearing 21 and the bearing fixing member 11 through heat insulating members 31 disposed between the load cell 30 and the bearing 21 and the load cell 30 and the bearing fixing member 11, respectively. Thus, when the actuator is mounted in an electric brake system (described below), the load cell 30 directly detects the force with which a brake pad 53 as the driven member is pressed against a disk rotor 52, which makes it possible to control the braking force with high accuracy.

Figure 5B:
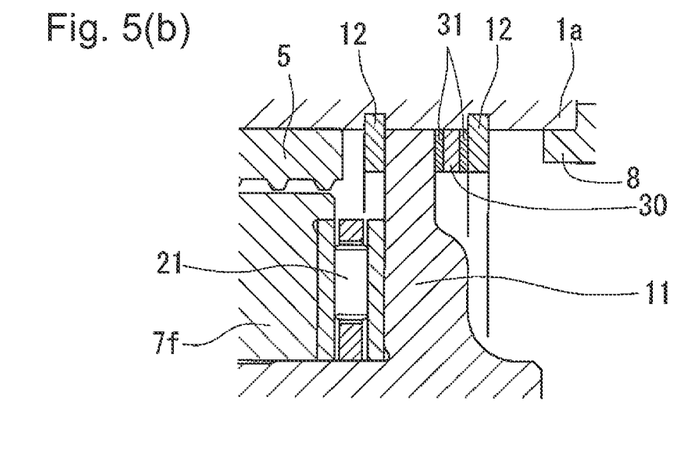

FIG. 5(b) shows a modified example in which the load cell 30 is arranged in a different manner. In this modified example, the load cell 30 is disposed between the bearing fixing member 11 as the backup member and one of the snap rings 12 as the stopper for restricting rearward movement of the bearing fixing member 11 through heat insulating members 31 disposed between the load cell 30 and the bearing fixing member 11 and between the load cell 30 and the snap ring 12, respectively.

Figure 6:
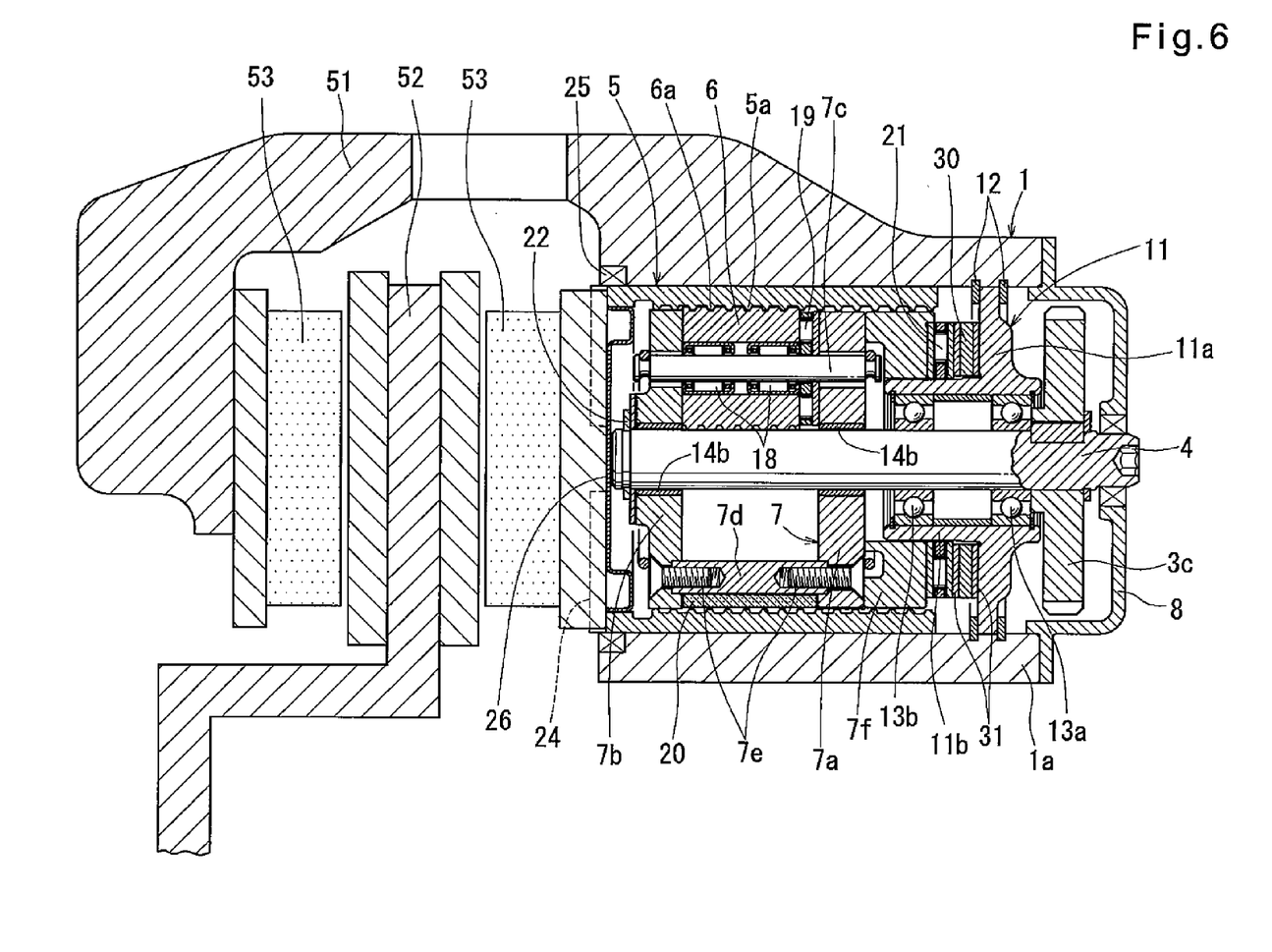
FIG. 6 is a vertical sectional view of an electric brake system including the electric linear motion actuator of FIG. 1.

FIG. 6 shows the electric brake system in which the above-mentioned electric linear motion actuator is mounted. The electric brake system includes a caliper body 51, the disk rotor 52 as a braked member, and brake pads 53 as braking members mounted in the caliper body 51 so as to face each other with the disk rotor 52 therebetween. The housing 1 of the electric linear motion actuator is fixed to the caliper body 51. Thus, when the outer ring member 5 as the output member is moved linearly in the forward direction, the brake pads 53 are linearly driven so as to be pressed against the disk rotor 52. FIG. 6 is a sectional view which is perpendicular to the section of FIG. 1.

Figure 7:
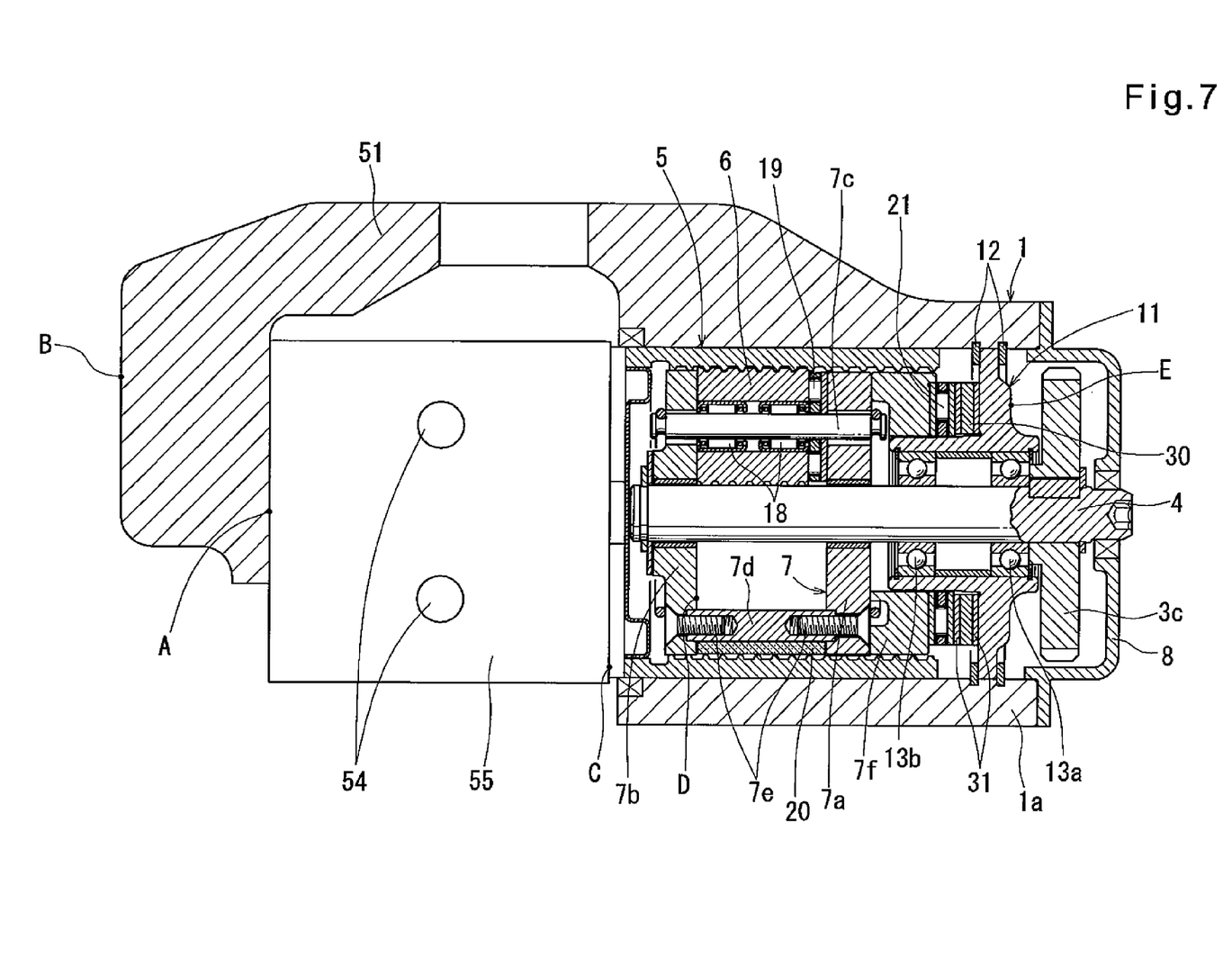
FIG. 7 is a vertical sectional view of a system similar to the electric brake system of FIG. 6 except that a dummy disk is mounted.

FIG. 7 shows a system similar to the electric brake system of FIG. 6 except that a dummy disk 55 carrying heaters 54 is mounted in the caliper body 51. This system was subjected to a temperature measurement test in which changes in temperatures at different points were measured when the dummy disk 55 was heated by the heaters 54. Temperatures were measured at five points, i.e. at point A of FIG. 7 (on surface of the dummy disk 55), point B (on the caliper body 51), point C (on the front end surface of the outer ring member 5), point D (on the rear surface of the support plate 7b of the carrier 7), and point E (on the rear surface of the bearing fixing member 11), when the dummy disk 55 was heated to 300° C. and kept at this temperature for an hour.

Figure 8:
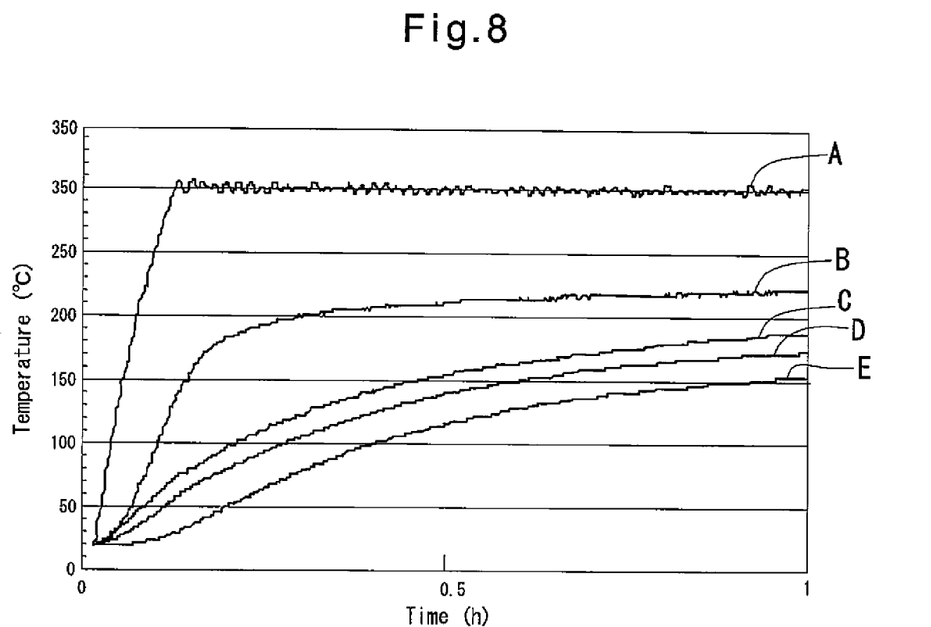
FIG. 8 is a graph showing the results of a temperature measurement test conducted on the system of FIG. 7.

FIG. 8 shows the results of the temperature measurement test. As the temperature of the dummy disk 55 rises, the temperature at point B (of the caliper body 51) rose quickly, exceeding 200° C. in a short period of time. But the temperatures at points C to E, which are points on the motion converter mechanism, rose relatively moderately and did not reach 200° C. after heating one hour. Among these points, the temperature rise was the smallest at point E, which is the point on the bearing fixing member 11, and is located farthest from the dummy disk 55 in the rearward direction. The temperature at point E rose only to about 150° C. after heating one hour. Thus, by mounting the load cell 30 at either of the positions shown in FIGS. 5(a) and 5(b), and by providing the heat insulating members 31, the load cell 30 can be sufficiently protected against the influence of heat.

In the above embodiment, a load cell is used as the load sensor. But the load sensor according to the present invention may be e.g. a piezoelectric sensor, a semiconductor load sensor, or a magnetostrictive load sensor. The load sensor may be mounted at a position in the motion converter mechanism other than the positions shown in FIGS. 5(a) and 5(b).

In the above embodiment, the motion converter mechanism for converting the rotary motion of the electric motor to linear motion includes the planetary rollers, which are disposed between the rotary shaft, to which the rotation of the electric motor is transmitted, and the outer ring member, and converts the rotary motion of the rotary shaft to the linear motion of the outer ring member. But instead, the motion converter mechanism may be configured to convert the rotary motion of the rotary shaft to the linear motion of the carrier. Also, the motion converter mechanism may be e.g. a slide screw mechanism, a ball-screw mechanism, or a ball-ramp mechanism.

In the above embodiment, the helical ribs are integrally formed on the radially inner surface of the outer ring member. But instead, the helical ribs may comprise separate rib members fitted in helical grooves formed in the radially inner surface of the outer ring member.

What is claimed is:

1. An electric linear motion actuator comprising:
   a housing;
   a rotary member rotatably mounted to the housing;
   an electric motor having a rotor shaft operably connected to the rotary member to transmit rotary motion of the rotor shaft to cause rotary motion of the rotary member;
   a motion converter mechanism provided in the housing for converting rotary motion of the rotor shaft of the electric motor, or rotary motion of the rotary member, to a linear motion of an output member for linearly driving a driven member in forward and rearward directions, wherein the driven member is configured to be pushed by a front side of the output member;
   a thrust bearing which receives a rearward reaction force of a pushing force of the output member;
   a backup member mounted in the housing and axially supporting the thrust bearing, the backup member including an annular portion and an axially elongated cylindrical portion extending from the annular portion, said annular portion and said cylindrical portion together having a single common radially inner surface;
   a plurality of bearings including first and second bearings mounted within said single common radially inner surface, such that the first and second bearings are axially spaced apart from each other and such that the first and second bearings are supported by the backup member;
   a stopper fixed to the housing and restricting axial movement of the backup member in a rearward direction;
   a load sensor mounted between the thrust bearing and the backup member, or between the backup member and the stopper; and
   a heat insulator protecting the load sensor;
   wherein the load sensor is configured to detect a pushing force with which the output member pushes the driven member when the driven member is linearly driven by the output member; and
   wherein the rotary member is rotatably supported by the backup member via the plurality of bearings.

2. The electric linear motion actuator of claim 1, wherein the load sensor is disposed between the backup member and a component part of the motion converter mechanism; and
   the heat insulator comprises a first heat insulator member disposed between the load sensor and said component part of the motion converter mechanism.

3. The electric linear motion actuator of claim 2, wherein the load sensor is one of a load cell, a piezoelectric sensor, a semiconductor load sensor and a magnetostrictive load sensor.

4. The electric linear motion actuator of claim 2, wherein the motion converter mechanism comprises a rotary shaft member which is one of the rotor shaft of the electric motor and a rotary shaft which comprises said rotary member, an outer ring member provided around the rotary shaft member and fitted in a radially inner surface of the housing, and a plurality of planetary rollers rotatably supported by a carrier so as to be disposed between the rotary shaft member and the outer ring member;
   the planetary rollers are configured to revolve around the rotary shaft member while rotating about axes of the individual planetary rollers when the rotary shaft member rotates; and
   a helical rib is formed on a radially inner surface of the outer ring member and each of the planetary rollers has on its radially outer surface circumferential grooves which are equal in pitch to the helical rib or a helical groove which is equal in pitch to, and different in lead angle from, the helical rib, said helical rib being engaged in the circumferential grooves or the helical grooves of the respective planetary rollers,
   whereby the motion converter mechanism converts the rotary motion of the rotary shaft member to linear motion of one of the outer ring member and the carrier as the output member for linearly driving the driven member, thereby linearly moving the outer ring member and the carrier relative to each other.

5. An electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is the electric linear motion actuator of claim 2.

6. The electric linear motion actuator of claim 2, wherein the heat insulator further comprises a second heat insulator member disposed between the load sensor and the backup member.

7. The electric linear motion actuator of claim 1, wherein the load sensor is one of a load cell, a piezoelectric sensor, a semiconductor load sensor and a magnetostrictive load sensor.

8. The electric linear motion actuator of claim 1, wherein the motion converter mechanism comprises a rotary shaft member which is one of the rotor shaft of the electric motor and a rotary shaft which comprises said rotary member, an outer ring member provided around the rotary shaft member and fitted in a radially inner surface of the housing, and a plurality of planetary rollers rotatably supported by a carrier so as to be disposed between the rotary shaft member and the outer ring member;

the planetary rollers are configured to revolve around the rotary shaft member while rotating about axes of the individual planetary rollers when the rotary shaft member rotates; and a helical rib is formed on a radially inner surface of the outer ring member and each of the planetary rollers has on its radially outer surface circumferential grooves which are equal in pitch to the helical rib or a helical groove which is equal in pitch to, and different in lead angle from, the helical rib, said helical rib being engaged in the circumferential grooves or the helical grooves of the respective planetary rollers, whereby the motion converter mechanism converts the rotary motion of the rotary shaft member to linear motion of one of the outer ring member and the carrier as the output member for linearly driving the driven member, thereby linearly moving the outer ring member and the carrier relative to each other.

9. An electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is the electric linear motion actuator of claim 1.

10. An electric linear motion actuator comprising:
a housing;
a rotary member rotatably mounted to the housing;
an electric motor having a rotor shaft operably connected to the rotary member to transmit rotary motion of the rotor shaft to cause rotary motion of the rotary member;
a motion converter mechanism provided in the housing for converting rotary motion of the rotor shaft of the electric motor, or rotary motion of the rotary member, to a linear motion of an output member for linearly driving a driven member in forward and rearward directions, wherein the driven member is configured to be pushed by a front side of the output member;
a thrust bearing which receives a rearward reaction force of a pushing force of the output member;
a backup member mounted in the housing and axially supporting the thrust bearing, the backup member including an annular portion and an axially elongated cylindrical portion extending from the annular portion, said annular portion and said cylindrical portion together having a single common radially inner surface;
a plurality of bearings including first and second bearings mounted within said single common radially inner surface, such that the first and second bearings are axially spaced apart from each other and such that the first and second bearings are supported by the backup member;
a stopper fixed to the housing and restricting axial movement of the backup member in a rearward direction; and a load sensor mounted between the thrust bearing and the backup member, or between the backup member and the stopper;

wherein the load sensor is configured to detect a pushing force with which the output member pushes the driven member when the driven member is linearly driven by the output member;

wherein the rotary member is rotatably supported by the backup member via the plurality of bearings; and wherein said thrust bearing is axially aligned with, and disposed circumferentially about, said axially elongated cylindrical portion of said backup member.

11. The electric linear motion actuator of claim 10, wherein the load sensor is one of a load cell, a piezoelectric sensor, a semiconductor load sensor and a magnetostrictive load sensor.

12. The electric linear motion actuator of claim 11, wherein the motion converter mechanism comprises a rotary shaft member which is one of the rotor shaft of the electric motor and a rotary shaft which comprises said rotary member, an outer ring member provided around the rotary shaft member and fitted in a radially inner surface of the housing, and a plurality of planetary rollers rotatably supported by a carrier so as to be disposed between the rotary shaft member and the outer ring member;

the planetary rollers are configured to revolve around the rotary shaft member while rotating about axes of the individual planetary rollers when the rotary shaft member rotates; and a helical rib is formed on a radially inner surface of the outer ring member and each of the planetary rollers has on its radially outer surface circumferential grooves which are equal in pitch to the helical rib or a helical groove which is equal in pitch to, and different in lead angle from, the helical rib, said helical rib being engaged in the circumferential grooves or the helical grooves of the respective planetary rollers, whereby the motion converter mechanism converts the rotary motion of the rotary shaft member to linear motion of one of the outer ring member and the carrier as the output member for linearly driving the driven member, thereby linearly moving the outer ring member and the carrier relative to each other.

13. An electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is the electric linear motion actuator of claim 11.

14. The electric linear motion actuator of claim 10, wherein the motion converter mechanism comprises a rotary shaft member which is one of the rotor shaft of the electric motor and a rotary shaft which comprises said rotary member, an outer ring member provided around the rotary shaft member and fitted in a radially inner surface of the housing, and a plurality of planetary rollers rotatably supported by a carrier so as to be disposed between the rotary shaft member and the outer ring member;

the planetary rollers are configured to revolve around the rotary shaft member while rotating about axes of the individual planetary rollers when the rotary shaft member rotates; and a helical rib is formed on a radially inner surface of the outer ring member and each of the planetary rollers has on its radially outer surface circumferential grooves which are equal in pitch to the helical rib or a helical groove which is equal in pitch to, and different in lead angle from, the helical rib, said helical rib being engaged in the circumferential grooves or the helical grooves of the respective planetary rollers, whereby the motion converter mechanism converts the rotary motion of the rotary shaft member to linear motion of one of the outer ring member and the carrier as the output member for linearly driving the driven member, thereby linearly moving the outer ring member and the carrier relative to each other.

15. The electric linear motion actuator of claim 14, wherein the carrier is prevented from moving axially, and the outer ring member is fitted in the housing so as to be rotationally fixed to the housing and slidable relative to the housing, whereby the outer ring member serves as the output member for linearly driving the outer ring member.

16. An electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is the electric linear motion actuator of claim 15.

17. An electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is the electric linear motion actuator of claim 14.

18. An electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is the electric linear motion actuator of claim 10.

19. The electric linear motion actuator of claim 10, wherein the stopper comprises an annular snap ring fixed to an inside wall of the housing behind the backup member.

20. The electric linear motion actuator of claim 19, wherein the backup member further comprises an annular portion mounted to the inside wall of the housing by the snap ring, and the cylindrical portion is provided at a radially inner side of the annular portion.

21. An electric brake system including an electric linear motion actuator for converting a rotary motion of an electric motor to a linear motion of an output member, thereby linearly driving a braking member, whereby the linearly driven braking member is pressed against a braked member, wherein the electric linear motion actuator is the electric linear motion actuator of claim 20.

22. The electric linear motion actuator of claim 10, wherein the backup member further comprises an annular portion mounted to an inside wall of the housing by the stopper, and the cylindrical portion is provided at a radially inner side of the annular portion.

23. The electric linear motion actuator of claim 10, wherein an outer ring member is fitted in the housing;

planetary rollers are disposed between the outer ring member and the rotary member;

a carrier supports the planetary rollers and includes a carrier body that is rotatably supported by the backup member via the thrust bearing through a support member; and the support member is axially aligned with, and disposed circumferentially about, said axially elongated cylindrical portion of said backup member.

24. The electric linear motion actuator of claim 23, wherein the backup member further comprises an annular member mounted so as to be axially fixed relative to the housing; and the cylindrical portion is provided at a radially inner side of the annular portion.

* * * * *